Figure 1:
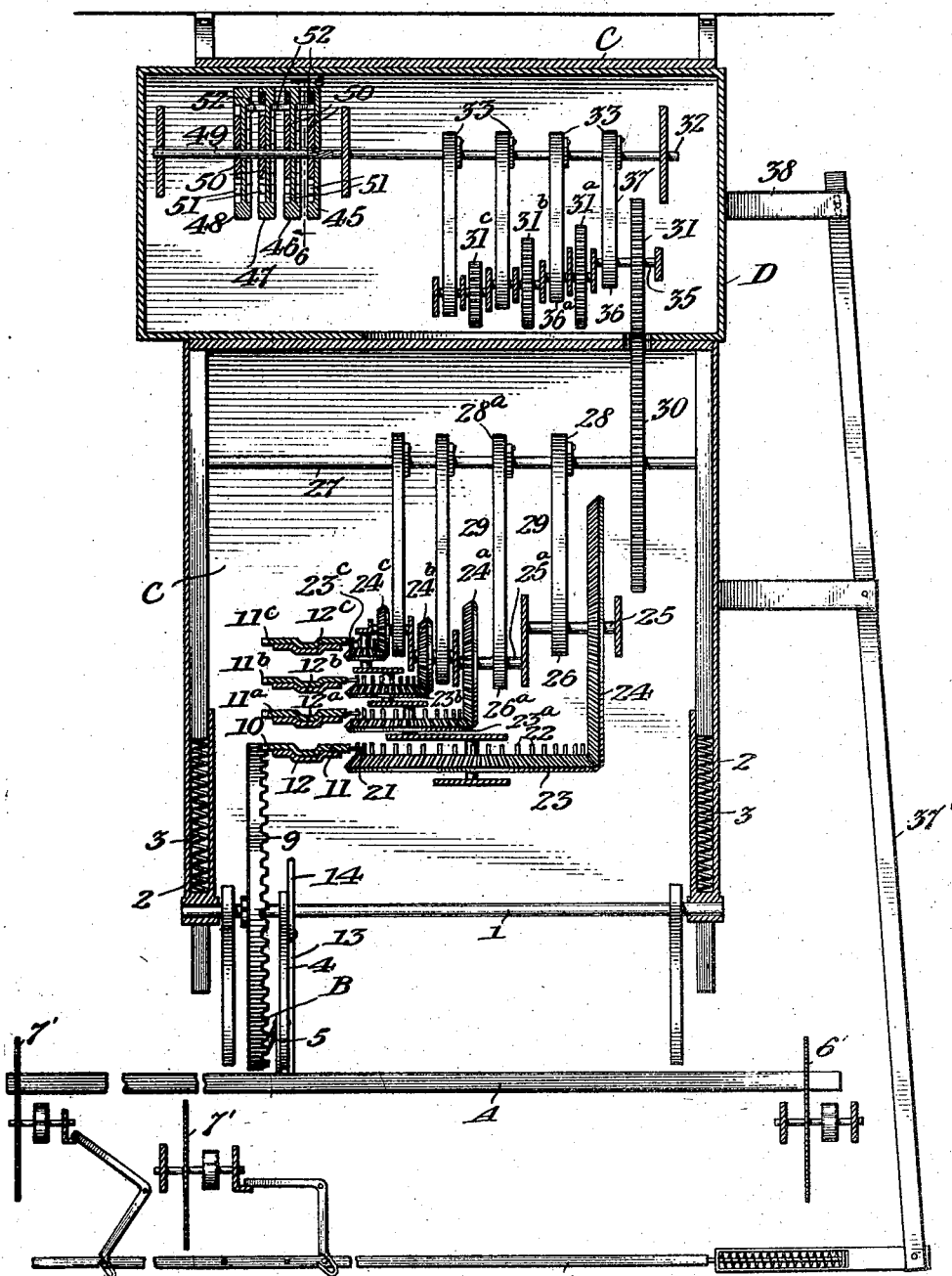

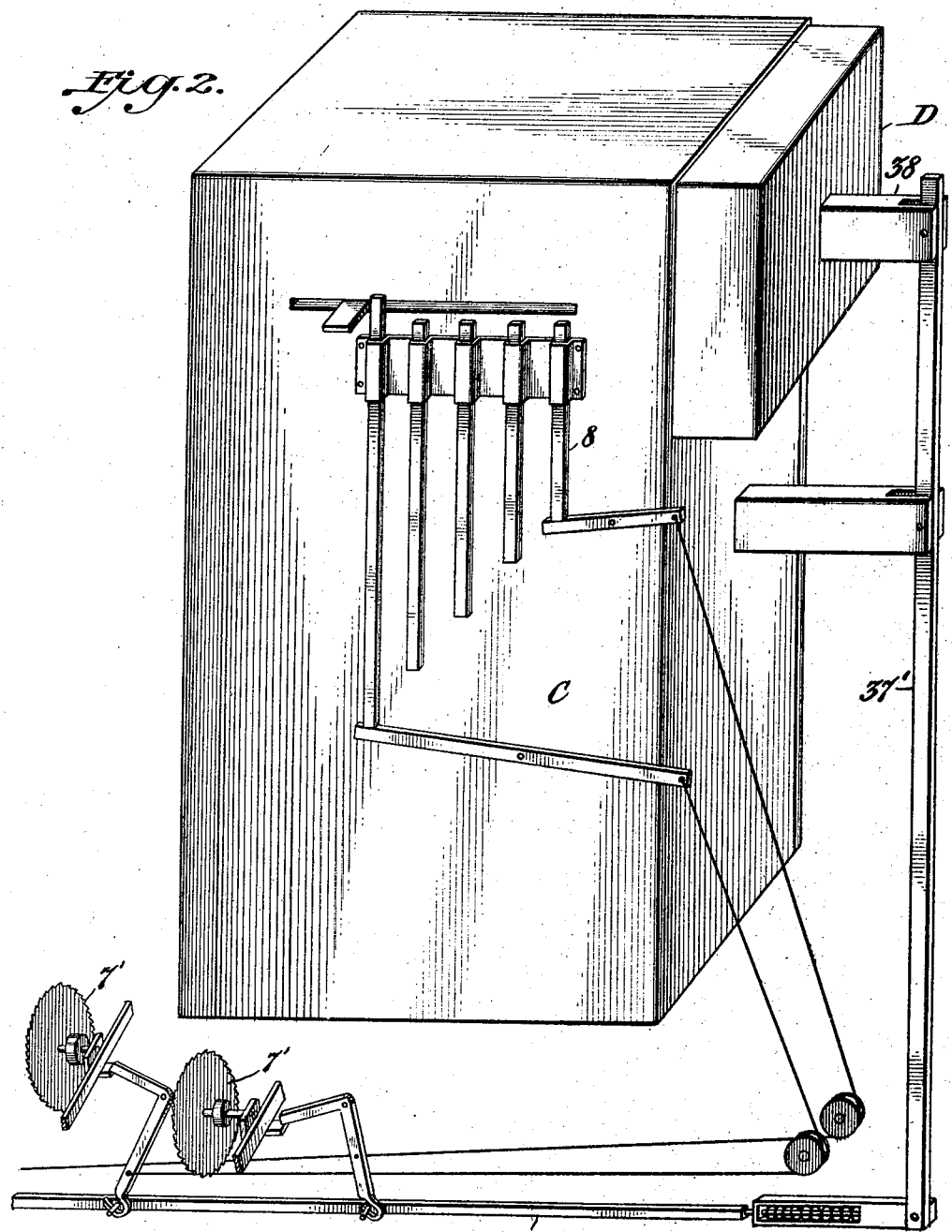

I. HILLIARD.
LUMBER MEASURING MACHINE.
APPLICATION FILED NOV. 2, 1914.
1,200,192. Patented Oct. 3, 1916.
3 SHEETS—SHEET 3.
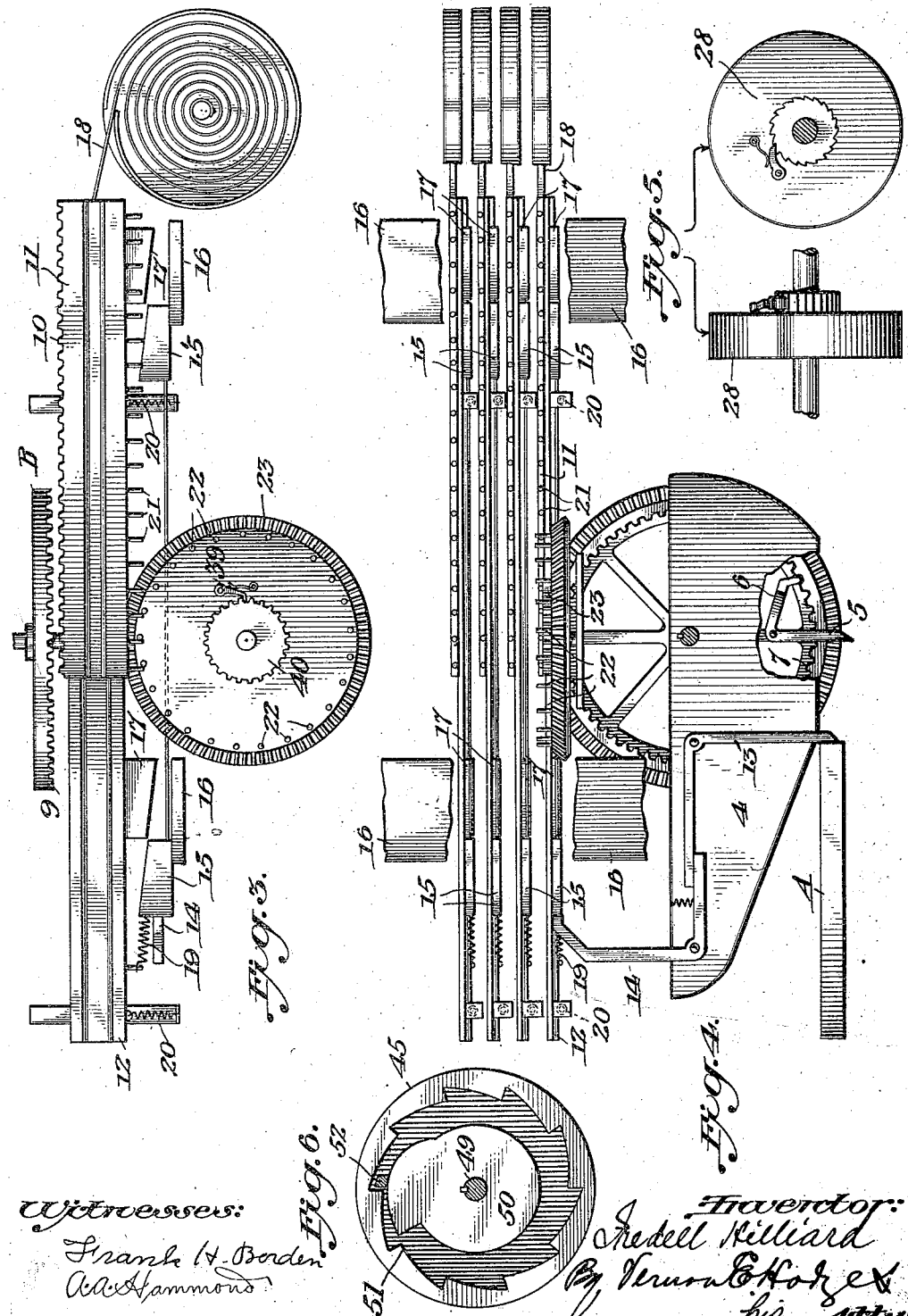

UNITED STATES PATENT OFFICE.

IREDELL HILLIARD, OF GEORGETOWN, SOUTH CAROLINA.

LUMBER-MEASURING MACHINE.

1,200,192.     Specification of Letters Patent.    Patented Oct. 3, 1916.

Application filed November 2, 1914. Serial No. 869,861.

*To all whom it may concern:*

Be it known that I, IREDELL HILLIARD, a citizen of the United States, residing at Georgetown, in the county of Georgetown and State of South Carolina, have invented certain new and useful Improvements in Lumber-Measuring Machines, of which the following is a specification.

My invention relates to an improvement in an apparatus for measuring lumber, and the object is to provide means which is actuated as the lumber is forced beneath it for setting in operation certain mechanism for registering the number of board feet in a plank which is passed beneath said means.

This machine is particularly adapted for the measurement of green lumber, and for allowing for the fraction of an inch in excess of commercial sizes allowed for shrinkage in the process of drying the lumber, so that the measurement indicated upon the register gives the commercial feet instead of the actual feet, of the lumber measured.

The invention still further consists of certain novel features of construction and combinations of parts which will be hereinafter described and pointed out in the claims.

In the accompanying drawings: Figure 1 is a vertical sectional view through the apparatus showing the mechanism in elevation; Fig. 2 is a perspective view of the casing containing the invention and the lever mechanism by which the carriage is operated by the saws. Fig. 3 is a detail plan view of the presser wheel track and slide bar and one of the horizontal wheels in top plan; Fig. 4 is a view of the same in elevation; Fig. 5 is a view of the horizontal wheels, showing the mechanism for locking the wheels against rearward movement, so that the shaft upon which the wheels are mounted will be caused to revolve in one direction only; and Fig. 6 is a sectional view on the line 6—6 of Fig. 1.

A represents the plank, which is being fed beneath the presser wheel B. The plank A is preferably fed over a trimmer table by the usual chain mechanism applied to such tables, all of which does not form a part of my invention, and hence has not been disclosed.

The plank is fed to the presser wheel laterally. The presser wheel B is mounted on a shaft 1, which is journaled in standards 2, 2 connected to the casing C, which is preferably suspended from the ceiling of the building. Springs 3, 3 are mounted in the standards 2, and tend to force the presser wheel B downward. Mounted upon the shaft 1 is a guide or foot 4, to which is connected the tripping lever 5. This lever is provided with a latch 6, which is adapted to engage teeth 7 formed on the inner surface or periphery of the presser wheel B. The presser wheel is preferably located about seven-eighths of an inch above the table, so that when the plank or board to be measured is forced beneath the wheel, the tripping lever is actuated, causing it to become disengaged from the wheel and allowing the wheel to travel across the board or plank.

We will assume, for example, that the board or plank A is one inch thick, twelve inches wide, and ten feet long. The board, as it is fed forward, will be brought into contact with the stationary saw 6', and as the board is to be cut ten feet long, the ends will be removed by the saws 6' and 7'. The movable saw 7' for cutting ten-foot lengths is brought up through the trimmer table and into a position for cutting the plank by the shifting of one of the levers 8. The presser wheel B has been caused to move upwardly by coming in contact with the one-inch plank, so that the teeth 9 formed on the side thereof are brought into engagement with the teeth 10 of the slide bar 11. The slide bar 11 is mounted upon the track 12, which track is capable of a lateral movement. The track 12 is caused to be moved laterally so that the teeth 10 of the bar 11 are brought into engagement with the teeth 9 of the presser wheel B by means of bell crank lever 13, which is pivotally mounted upon the guide or foot 4. One end of this lever is arranged in a position so that it is actuated by the plank A, as the plank is fed beneath the guide or foot 4. An auxiliary bell crank lever 14 is operated by the bell crank lever 13. The actuation of the bell crank lever 14, causes the wedges 15, which are suitably connected together, to be forced between the uprights 16, 16 and wedge blocks 17, 17 on the track 12. As these blocks 15 are forced between the blocks 17 and uprights 16, the track is moved laterally, thereby causing engagement between teeth 10 of bar 11, and the teeth 9 of presser wheel B.

The plank A is continually fed forward beneath the presser wheel, causing the wheel B to rotate. The rotation of the presser wheel B caus the bar 11 to be moved longitudinally of the track 12 against the tensir t of a coil spring 18. After the presser foot has traveled the width of the plank A, the trip lever 5 will be released from engagement with the plank, and the latch 6 will again fall into engagement with the teeth of the wheel and prevent the wheel from rotating. The bell crank levers 13 and 14 will be released, and the wedge blocks 15, 15 will be caused to return to their normal position by the spiral springs 19. Springs 20, 20 are connected to the track 12, and as the wedges 15 are withdrawn, the springs will cause the track to be returned to its normal position.

The bar 11 is provided on its opposite edge with pins 21, 21 which are adapted to engage pins 22, 22 on the horizontal gear wheel 23. The bar 11 having been disconnected from the presser wheel B, spring 18 will be allowed to rewind, thereby drawing the bar to its normal position, and as the pins 21 and 22 are brought into alinement with each other, the gear wheel 23 will revolve. The revolving of the gear wheel 23 causes a vertical gear wheel 24 to be rotated, the gear wheel 24 being mounted upon the shaft 25, and meshing with the gear wheel 23. Mounted upon the shaft 25 is a pulley 26. A shaft 27 carries a plurality of pulleys 28. One of these pulleys 28 is connected to pulley 26 by belt 29. A large gear 30 is mounted upon this shaft, and is adapted to be brought into engagement with gear wheel 31 journaled in the carriage or cage D. The counting or registering shaft 32 is provided with a plurality of pulleys 33, and mounted on this shaft are the registering dials 34. Each gear wheel 31 is mounted upon the shaft 35, and mounted on the shaft is a pulley 36, which is connected to one of the pulleys 33 by belt 37. Motion, therefore, has been transmitted from the presser wheel B through the gear wheels 23, 24, 30 and 31, and pulleys 36 and 33 to the counting or registering shaft 32. The gear wheel 31, which should be just 12 inches in circumference, will therefore be revolved one complete revolution, thus the width of the plank is measured, and the motion is transmitted to the shaft 32 through the belt 37 and pulleys 33 and 36, causing the unit wheels of the counting device to be revolved a complete revolution, thereby returning to their original position, and carrying the tens wheel of the counting device one space forward, and registering ten feet, the number of board feet in a plank one inch by twelve inches by ten feet.

The pins 21 of the bar 11 are placed at intervals of one inch, and the pins 22 on the wheels 23 at similar intervals, so that when any pin on the bar 11 has been carried less than one inch beyond a pin on the wheel 23 at the point of contact, the bar will move an equal distance on its return trip, before the pins engage, thereby eliminating the measuring of fractions, and recording only full inches.

If it should be desired, for instance, to measure a board 2 inches by 12 inches by 12 feet, the presser wheel B would be raised to an elevation to bring it in contact with the slide bar 11$^a$ mounted upon the track 12$^a$. Motion would be transmitted from the track 11$^a$ through gear wheel 23$^a$, and the wheel 23$^a$ would cause the vertical gear wheel 24$^a$ to be revolved. The shaft 25$^a$ upon which the wheel 24$^a$ is mounted has a pulley 26$^a$ mounted thereon, and a belt 29 connects the pulley 26$^a$ with the pulley 28$^a$ on the shaft 27. Now, in this instance, one of the levers 8 has been moved for causing the twelve-foot saw 7' to be raised. This saw is connected to a link 36', which has flexible connection with the lever 37', and the lever 37' is connected to the cage D by an arm 38. As the s. v is raised, it will actuate the link 36', and lever 37', causing the cage D to be drawn outward, so that the gear wheel 31$^a$ will be brought into engagement with the wheel 30, so that the motion is transmitted to the wheel 31$^a$ and from the wheel 31$^a$ through the pulley 36$^a$ by means of a belt 37, by one of the sprocket wheels 33 on shaft 32, so that the registering device will indicate or show a record of 24 feet, being the contents of a plank 2 inches by 12 inches by 12 feet. This same operation is carried out through the various bars 11, 11$^b$, 11$^c$, and tracks 12$^b$ and 12$^c$ to the gear wheels 23$^b$ and 23$^c$ and the vertical wheels 24$^b$ and 24$^c$.

As to the sizes of the wheels 31, 31$^a$, 31$^b$, and 31$^c$ for getting the length measurements, the wheel which represents the ten-foot length as explained before will be 12 inches in circumference, while the wheel for measuring the twelve-foot board, in order that it may revolve one and one-fifth times with every twelve inches of contact with the vertical transmission wheel would be ten inches in circumference, in other words, six-fifths of the circumference of this wheel would be equal to twelve inches, one-fifth would be two inches, and five-fifths would be ten inches. By the same process we find that the wheel for 14, 16, 18 and 20 foot boards would be respectively 8$\frac{4}{7}$, 7$\frac{1}{2}$, 6$\frac{2}{3}$ and 6 inches in circumference.

The wheels 23, 23$^a$, 23$^b$ and 23$^c$ are all held against rotation, that is, the wheels are allowed to rotate in one direction only. Each wheel carries a spring-controlled pawl 39, which is adapted to engage with the ratchet wheel 40, which is securely fastened to the shaft upon which the wheels rotate, so that the wheels are locked to the shaft when traveling in one direction, and cannot transmit motion in a contrary direction to the wheels 24, 24ᵃ, 24ᵇ, and 24ᶜ. With an apparatus of this character, it is possible to measure lumber of any thickness or length, the only requirement being that a sufficient number of horizontal wheels 23 and vertical wheels 24 and 31 be provided for the different thickness of lumber.

The registering device can be of any approved form, so long as it is capable of indicating the board feet of all the lumber that passes over the trimmer table and beneath the presser wheel. The register merely records the number of board feet in each piece of lumber. In the drawings I have disclosed a mechanism which consists of a plurality of disks 45, 46, 47 and 48. The disk 45 is fastened to the shaft 32, while the disks 46, 47, and 48 are loosely mounted upon an auxiliary shaft 49, which shaft is stationary, and is fastened to the casing D, one end of the shaft being supported by the shaft 32. Located between each of the various disks is a cam 50. These cams are all mounted upon the shaft 49, and are held stationary. The inner periphery of each of the disks is provided with a plurality of teeth 51, which are adapted to be engaged by a movable pin 52, which is caused to engage a tooth as one of the disks carries the pin to the highest point of the cam 50. Assuming for instance, that the unit disk 45 is being rotated by the shaft 32, the pin would engage a tooth of the tens disk on wheel 46 for causing it to be rotated, and the various disks would be caused to rotate in this manner for registering the total amount of lumber passing beneath the presser wheel. Each disk on wheels 45, 46, 47 and 48 is provided with the usual numerals from 0 to 9, so that as they are rotated, they will indicate the number of feet passing beneath the presser wheel. For instance, if a board containing ten board feet is passed beneath the presser wheel, it would cause the units disk 45 to make one complete revolution, when the pin 52 would engage a tooth on the tens wheel or disk 46 and cause it to be moved one point, so that the tens wheel would show the numeral 1, and the units wheel a 0, indicating ten board feet.

I claim:

1. In a lumber measuring device, the combination with a yielding presser wheel, of a plurality of bars, a plurality of gear wheels in engagement with said bars, said presser wheel capable of actuating any of said bars and thereby actuating any of said gear wheels, a registering device, and means connecting the various gear wheels with the registering device.

2. In a lumber measuring device, the combination with a yielding presser wheel, of a plurality of bars, a plurality of gear wheels in engagement with said bars, said presser wheel capable of actuating any of said bars and thereby actuating any of said gear wheels, a shaft having an auxiliary gear wheel thereon, means connecting the several gear wheels with the shaft for rotating the gear wheel thereon, a registering device, a plurality of gears connected to the registering device, and means for causing the desired gear to be brought into engagement with the auxiliary gear wheel to operate the registering device.

3. In a lumber measuring device, the combination with a yielding presser wheel, of a plurality of bars, a plurality of gear wheels of various sizes in engagement with said bars, said presser wheel capable of actuating any one of said bars, a registering device, and means for transmitting the motion of each of the gear wheels separately to the registering device.

4. In a lumber-measuring machine, the combination with a yielding presser wheel, of a plurality of various sized gear wheels, spring-controlled means located adjacent to and for rotating each of said gear wheels, said means adapted to be engaged by the presser wheel whereby motion can be transmitted to one of said gear wheels, a registering device, and means for transmitting motion of the gear wheels to the registering device.

5. In a lumber-measuring machine, the combination with a yielding presser wheel, of a plurality of various sized gear wheels, spring controlled bars located adjacent to and in engagement with each of the gear wheels, means for causing one of the bars to be thrown into engagement with the presser wheel, whereby the bar will be caused to move as the wheel travels across the board to be measured, said bar being released from engagement with the wheel as the wheel passes from the board, means whereby the bar is caused to engage the gear wheel for causing the gear wheel to be rotated, a registering device, and means for transmitting motion of the gear wheel to the registering device.

6. In a lumber-measuring device, the combination with a yielding presser wheel, of a plurality of various sized gear wheels, of movable bars in engagement with the gear wheels, means for causing the bars to move in one direction, means for causing one of said bars to be thrown out of engagement with the gear wheel and into engagement with the presser wheel as the presser wheel begins to move over the board to be measured, whereby the bar is caused to move, said bar adapted to be released from engagement with the presser wheel as the presser wheel passes from the board and is returned to its normal position and into engagement with the gear wheel, whereby the gear wheel will be rotated, a registering device, and means for transmitting the motion of the gear wheel to the registering device.

In testimony whereof I affix my signature, in the presence of two witnesses.

IREDELL HILLIARD.

Witnesses:
 FRED. A. SUYDAM,
 E. R. MENZER.

Copies of this patent may be obtained for five cents each, by addressing the "Commissioner of Patents, Washington, D. C."